United States Patent [19]

Marks et al.

[11] Patent Number: 5,603,557
[45] Date of Patent: Feb. 18, 1997

[54] APPLIANCE FRONT PANEL RETAINER

[75] Inventors: Larry D. Marks, St. Joseph Township; Raymond W. Spiegel, Lincoln Township, both of Mich.

[73] Assignee: Whirlpool Corporation, Benton Harbor, Mich.

[21] Appl. No.: 266,345

[22] Filed: Jul. 1, 1994

[51] Int. Cl.⁶ .............................. E06B 1/00; E04B 1/684
[52] U.S. Cl. ..................................... 312/265.6; 52/717.01
[58] Field of Search ................................. 312/236, 257.1, 312/204, 111, 209, 265.5, 265.6, 138.1, 228, 109, 140.1–140.3, 406, 406.2; 52/716.1, 716.4, 716.6, 716.8, 718.04, 717.05

[56] References Cited

U.S. PATENT DOCUMENTS

| | | | |
|---|---|---|---|
| 3,294,461 | 12/1966 | Barnard et al. | 312/213 |
| 3,298,764 | 1/1967 | Goldfarb | 312/204 |
| 3,442,059 | 5/1969 | Kessler | 52/717.01 X |
| 3,766,698 | 10/1973 | Dallen | 52/717.01 X |
| 3,936,107 | 2/1976 | Gourdeau | 312/204 X |
| 4,165,083 | 8/1979 | Dochnahl | 52/716.6 X |
| 4,229,921 | 10/1980 | Schell | 312/204 X |
| 4,233,790 | 11/1980 | Meadows | 52/717.01 X |
| 4,335,552 | 6/1982 | Blanchett et al. | 52/717.01 X |
| 4,732,431 | 3/1988 | Mason | 312/109 |
| 4,949,520 | 8/1990 | Bear | 52/288 |
| 5,155,952 | 10/1992 | Herwegh et al. | 52/717.01 X |
| 5,353,571 | 10/1994 | Berdan et al. | 52/718.04 X |

*Primary Examiner*—Peter M. Cuomo
*Assistant Examiner*—Robert J. Sandy
*Attorney, Agent, or Firm*—Hill, Steadman & Simpson

[57] ABSTRACT

A kitchen appliance is provided with a removable, replaceable front panel. The bottom edge of the panel is retained by a resilient retainer strip which fits into a channel member. The remaining edges of the panel are retained in grooves disposed in a door frame and control panel. The retainer strip and channel member are configured to snap-fit together. The retainer strip can easily be removed and reinstalled without the use of tools.

20 Claims, 2 Drawing Sheets

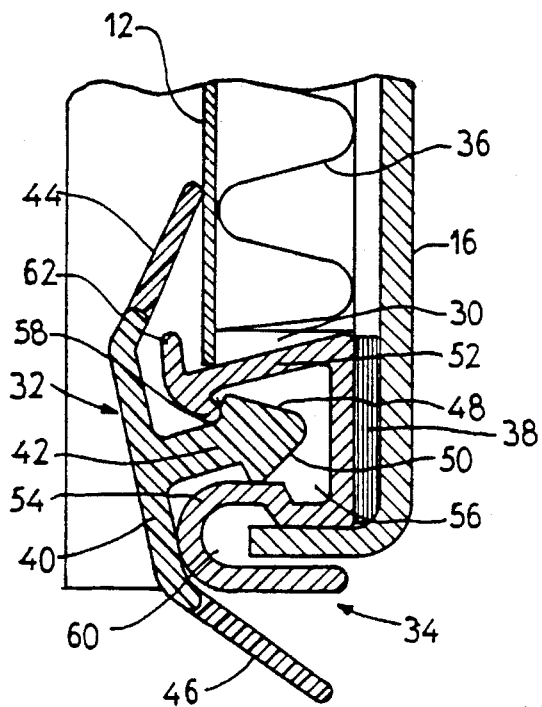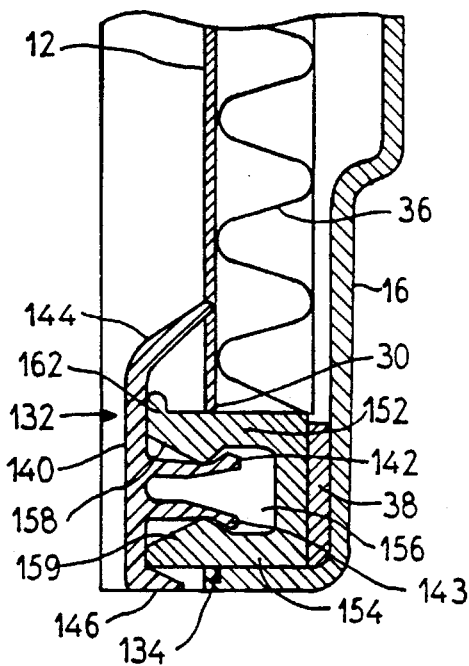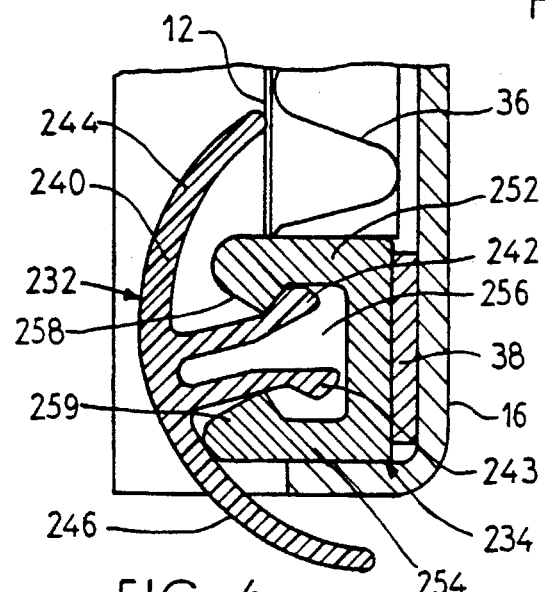

APPLIANCE FRONT PANEL RETAINER

BACKGROUND OF THE INVENTION

This invention generally relates to retaining devices. More particularly, this invention relates to a snap-fit retainer for a panel.

An appliance generally has a visible external surface. Such a surface can consist of a decorative panel which can be painted or constructed of colored material for aesthetic purposes. For instance, a dishwasher, trash compactor, or other kitchen appliance can have a decorative front surface. The present invention is particularly suited for use on a dishwasher.

A front panel of an appliance can be interchangeable so that a user can change the decorative look of the appliance. For example, multiple panels of different colors can be provided with the appliance. A user can select and install a desired panel.

A replaceable front panel of an appliance or cabinet is generally fitted into a frame structure, where it is retained by a retaining device. However, known retaining devices can require the use of tools. Furthermore, known retaining devices can be difficult to use or understand.

U.S. Pat. No. 4,732,431 discloses a frame for interchangeable panels for a dishwasher. A retainer strip is held in place by a screw for securing a panel within a door frame. Alternatively, the retainer strip has resilient ramped legs which snap into holes in the frame for securing the panel in place. To remove the snap-fit retainer strip, the resilient ramped legs must be deflected clear of the hole.

U.S. Pat. No. 4,229,921 discloses a frame for a decorative appliance panel. The decorative panel frame is secured to the appliance door by a plurality of threaded screws.

U.S. Pat. No. 3,298,764 discloses a cabinet door with a removable mirrored panel. The mirror is retained in position by pieces that fit into channels and held therein by an adhesive.

U.S. Pat. No. 3,294,461 discloses a dishwasher having a front panel retained by strips held in place by screws.

U.S. Pat. No. 3,936,107 discloses an interchangeable door panel held in place by a retainer strip having tabs to fit in slots in a door frame.

U.S. Pat. No. 4,949,520 discloses edge retainer strips for a modular room panel structure.

Thus, the prior art shows a number of different structural arrangements for retaining interchangeable door panels in appliances. However, a need exists for a means of retaining interchangeable decorative appliance panels which is simple to use and requires no tools.

SUMMARY OF THE INVENTION

The present invention provides a panel retaining device which overcomes the deficiencies of known retaining devices. More specifically, the present invention relates to an apparatus for retaining an edge of a panel, particularly for use on a front panel of a dishwasher.

To this end, in an embodiment, an appliance is provided which has a removable panel. The appliance has a frame with grooves disposed therein. A channel member is secured to the frame and disposed adjacently to the panel. An elongated retainer strip is provided which has at least one projection that extends substantially a length of the retainer strip. The at least one projection fits into the channel member so that the retainer strip can retain an edge of the panel. The remaining edges of the panel are retained in the grooves of the frame.

In an embodiment, the appliance is a dishwasher.

In an embodiment, the panel is on a door.

In an embodiment, the retainer strip retains a bottom edge of the panel.

In an embodiment, the retainer strip is slightly longer than the channel member.

In an embodiment, the at least one projection is a single T-shaped projection.

In an embodiment, the at least one projection is a pair of projections.

It is, therefore, an advantage of the present invention to provide an apparatus for retaining a panel.

A further advantage of the present invention is to provide an apparatus for retaining an edge of a panel which does not require the use of tools.

Another advantage of the present invention is to provide an apparatus for retaining a panel which is difficult to install improperly.

Yet another advantage of the present invention is to provide an apparatus for easily removing a replaceable front panel of a dishwasher.

Additional features and advantages of the present invention are described in, and will be apparent from, the detailed description of the presently preferred embodiments and from the drawings.

BRIEF DESCRIPTION OF THE DRAWINGS

FIG. 3 illustrates a sectional top view of a door assembly embodying features of the present invention.

FIG. 4 illustrates a sectional side view of a retainer clip structure of the present invention taken generally along line IV—IV of FIG. 2.

FIG. 5 illustrates a sectional side view of an alternative embodiment of a retainer clip structure of the present invention taken generally at the same place as FIG. 4.

FIG. 6 illustrates a sectional side view of another alternative embodiment of a retainer clip structure of the present invention taken generally at the same place as FIG. 4.

DETAILED DESCRIPTION OF THE PRESENTLY PREFERRED EMBODIMENTS

In accordance with the invention described with reference to the accompanying figures wherein like numerals designate like parts, an appliance 10 is provided which has a front panel 12. The appliance 10 illustrated in FIG. 1 is a dishwasher, however, the present invention could be used with other appliances or other objects having a removable panel.

Figure 1:
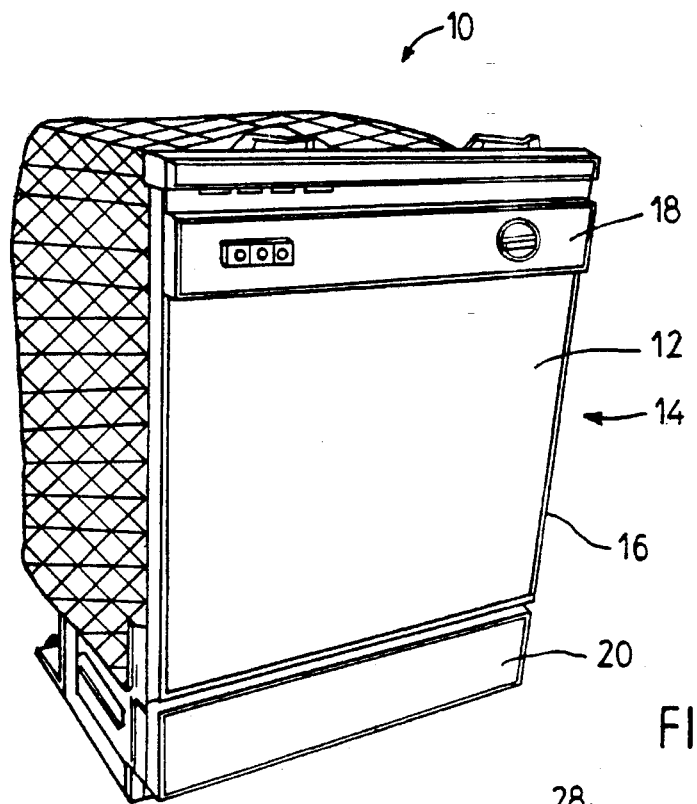
FIG. 1 illustrates a perspective view of a dishwasher which embodies the features of the present invention.

As illustrated in FIG. 1, the front panel 12 is disposed in a door 14 of the appliance 10. The door 14 has a frame 16 which generally surrounds the front panel 12. The dishwasher 10 shown in FIG. 1, has a control panel 18 positioned along the top of the door 14 and a lower access panel 20 positioned below the door 14.

In a domestic environment, a dishwasher 10 is typically installed in a kitchen cabinet structure (not shown) so that the front of the dishwasher 10 is exposed for access. Thus, the front panel 12 of the dishwasher 10 is visible in a kitchen. Therefore, the front panel 12 is preferably painted or constructed of a colored material. The front panel 12 can be removed and exchanged with another panel having a different color. Optionally, a front panel 12 can be provided having a different color on each side so that it can be turned around for changing the aesthetic appearance of the dishwasher 10.

Figure 2:
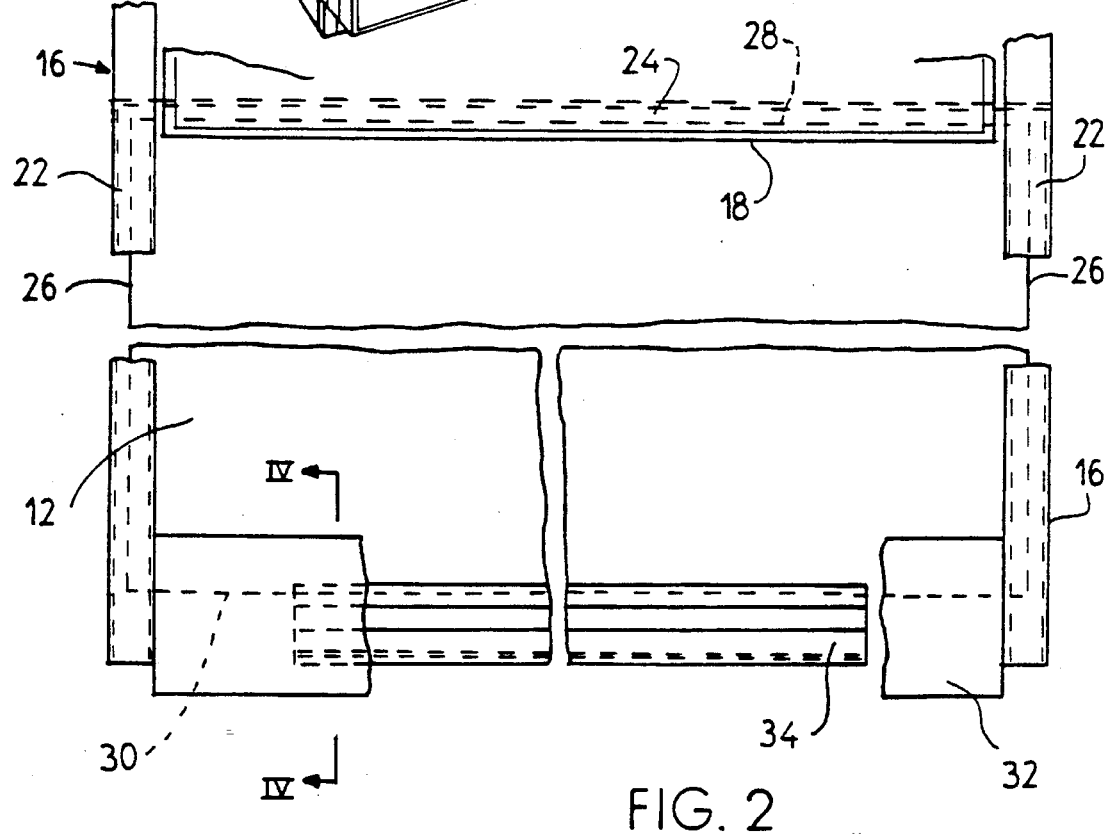
FIG. 2 illustrates a fragmentary front plan view of a door assembly having positions broken away to reveal features of the present invention.

Referring to FIG. 2, the retaining means of the present invention is illustrated. Two sides of the front panel 12 are received by the frame 16 into two vertical side grooves 22 and a third side is received in a horizontal top groove 24 in the control panel 18. The side grooves 22 receive side edges 26 of the front panel 12, and the top groove 24 receives a top edge 28 of the front panel 12. A bottom edge 30 of the front panel 12 is secured in position by a retainer strip 32, 132, 232.

The retainer strip 32, 132, 232 is an elongated, resilient component which can be extruded from a plastic material. The retainer strip 32, 132, 232 is held in position by an elongated channel member 34, 134, 234 which is secured to the bottom of the frame 16. The channel member 34, 134, 234 is preferably resilient and can be extruded from a plastic material. The retainer strip 32, 132, 232 is held firmly by the channel member 34, 134, 234 against the front panel 12 so that the retainer strip 32, 132, 232 is biased against the front panel 12, holding the front panel 12 in position. Preferably, the retainer strip 32, 132, 232 is slightly longer than the channel member 34, 134, 234.

FIG. 3 illustrates the shape of the frame 16 which has the side grooves 22 formed therein. Preferably, a corrugated spacer panel 36 is positioned behind the front panel 12. The edges of the corrugated spacer panel 36 also extend into the side grooves 22 and the top groove 24.

The preferred embodiment of the retainer strip 32 and channel member 34 are illustrated in greater detail in FIG. 4. The elongated channel member 34 is attached to the frame 16 and extends horizontally across the bottom of the door 14. The channel member 34 is preferably attached to the frame 16 using double-sided adhesive foam tape 38. Alternatively, the channel member 34 could be attached to the frame 16 with screws, molded snaps, rivets or some other connection means.

The retainer strip 32 is configured to snap-fit into the channel member 34. The retainer strip 32 has an elongated resilient member 40. In the preferred embodiment, a T-shaped projection 42 extends generally perpendicularly from the elongated resilient member 40 and preferably extends the length of the resilient member 40. Also, the elongated resilient member 40 has an upper half 44 which is prone toward the direction of the front panel 12. The upper half 44 can be angled, as illustrated in FIG. 4 or it could be curved on an arc, as in FIG. 6. The T-shaped projection 42 is shaped to be received and held within the channel member 34 so that the upper half 44 is held in biased contact against the panel 12, slightly deflecting the upper half 44.

Preferably, the retainer strip 32 is symmetrical on either side of the T-shaped projection 42. This prevents a user from installing the retainer strip 32 upside-down. For this reason, a lower half 46 is preferably provided which is symmetrical to the upper half 44.

In the preferred embodiment, the T-shaped projection 42 has an upper ramped edge 48 and a lower ramped edge 50.

The upper ramped edge 48 and lower ramped edge 50 are preferably symmetrical to each other. Also in the preferred embodiment, the channel member 34 has a resilient upper ledge 52 which extends in a generally forward direction. Also, the channel member 34 has a lower resilient ledge 54 that extends generally in a forward direction. Between the upper ledge 52 and the lower ledge 54, a channel interior 56 is defined. The channel member 34 and retainer strip 32 are configured so that the channel member 34 can cooperatively receive the T-shaped projection 42 between the upper ledge 52 and the lower ledge 54.

The upper ledge 52 has a lip 58 disposed along the upper ledge 52, extending downwardly. The lower ledge 54 preferably extends out of the channel interior 56, curving down and away, forming a hollow area 60. The T-shaped projection 42 is insertable between the upper ledge 52 and the lower ledge 54. The upper ledge 52 and lower ledge 54 can be deflected, allowing the T-shaped projection 42 to slide into the channel interior 56. The lip 58 snaps down over the upper ramped edge 48 when the T-shaped projection 42 is inserted into the channel interior 56. Similarly, the lower ramped edge 50 contacts the lower ledge 54 at an angle which biases the T-shaped projection 42 into the channel interior 56 with a sort of camming action.

Preferably, a ridge 62 can be provided which extends upwardly from the upper ledge 52. The ridge 62 assists a user by positioning the bottom edge 30 of the panel 12 before the retainer strip 32 has been inserted into the channel member 34.

FIG. 5 illustrates an alternative embodiment of the present invention. In this embodiment, a retainer strip 132 has two projections, an upper projection 142 and a lower projection 143 which extend from a resilient member 140. A channel member 134 has an upper ledge 152 and a lower ledge 154. Between the upper ledge 152 and the lower ledge 154, a channel interior 156 is defined. The upper ledge 152 has a first lip 158 that extends downward into the channel interior. In this embodiment, the lower ledge 154 has a second lip 159 that extends upwardly into the channel interior 156. The first lip 158 and second lip 159 fit over the upper projection 142 and lower projection 143, respectively, to secure the retainer strip 132 to the channel member 134.

The channel member 134 is shaped to receive the upper projection 142 and lower projection 143 in a snap-fit manner. The upper projection 142 and lower projection 143 fit into the channel interior 156, between the upper ledge 152 and the lower ledge 154. The upper projection 142 and lower projection 143 are biased away from one another when in the channel interior 156. In the embodiment of FIG. 5, the retainer strip 132 is not symmetrical on either side of its two projections 142, 143. The resilient member 140 has an upper half 144 which is held in biased contact against the front panel 12. However, the resilient member 140 has a lower half 146 that is short and wraps down around the tip of the lower ledge 154.

FIG. 6 illustrates another alternative embodiment which provides a retainer strip 232 that is symmetrical on either side of an upper projection 242 and a lower projection 243. The upper projection 242 and lower projection 243 extend generally perpendicularly from a resilient member 240. In this embodiment, the elongated resilient member 240 has an upper half 244 and a lower half 246 which are curved in a substantially arcuate fashion. However, the resilient member 240 could have an angled shape, as described above and as shown in FIG. 4.

The retainer strip 232 fits into a channel member 234. The channel member 234 has an upper ledge 252 and a lower ledge 254 which define a channel interior 256. The upper ledge 252 has a first lip 258 and the lower ledge 254 has a second lip 259. The first lip 258 and second lip 259 fit over the upper projection 242 and lower projection 243, respectively, to secure the retainer strip 232 to the channel member 234.

In the embodiments illustrated in FIGS. 5 and 6, it is important that the upper projections 142, 242 and lower projections 143, 243 are resiliently deflectable. While it is preferable that the upper ledge 152, 252 and lower ledge 154, 254 also be resilient and deflectable in these embodiments, the upper ledge 152, 252 and lower ledge 154, 254 can be somewhat rigid because of the deflection of the two projections. On the other hand, the upper ledge 52 and lower ledge 54 in the embodiment illustrated in FIG. 4 must be resilient and deflectable in order to receive the single T-shaped projection 42.

When a user installs a front panel 12, the front panel 12 is bowed vertically so that the side edges 26 can be positioned in the vertical side grooves 22. The front panel 12 is then slid upward so that the top edge 28 of the front panel 12 is received into the horizontal top groove 24 disposed in the control panel 18. The bottom edge 30 of the front panel 12 can rest on the upper ledge 52, 152, 252 so that it is positioned behind the ridge 62. The user can then take his hands off of the front panel 12 while inserting the retainer strip 32, 132, 232. The user presses the retainer strip 32, 132, 232 so that the projection 42 or projections 142, 143, 242, 243 are received into the channel interior 56, 156, 256 where the projection 42 or projections 142, 143, 242, 243 are held by a snap-fit. The upper half 44, 144, 244 of the resilient member 40, 140, 240 is held in contact against the front panel 12, holding the front panel 12 in position within the frame 16 and against the corrugated spacer panel 36.

The retainer strip 32, 132, 232 can be removed by pulling on an end of the retainer strip, peeling the retainer strip 32, 132, 232 away from the channel member 34, 134, 234. Because the retainer strip 32, 132, 232 is preferably slightly longer than the channel member 34, 134, 234 as shown in FIG. 2, a user can grip an end of the retainer strip 32, 132, 232 easily without the use of any tools.

When the retainer strip 32 is peeled from the channel member 34, in the embodiment shown in FIG. 4, the resilient upper ledge 52 and resilient lower ledge 54 deflect away from each other. This allows the upper ramped edge 48 to clear the lip 58 and allowing the lower ramped edge 50 to clear the lower ledge 54, so that the T-shaped projection 42 can be pulled from the channel interior 56. In the embodiments illustrated in FIGS. 5 and 6, the upper projection 142, 242 and lower projection 143, 243 can be deflected toward one another so that they can be pulled from the channel interior 56.

Once the retainer strip 32, 132, 232 has been removed, a user can remove the front panel 12 by sliding the front panel 12 upward so that the bottom edge 30 of the front panel 12 can be pulled clear of the upwardly extending ridge 62. The front panel 12 is then slid downward until the top edge 28 is clear of the horizontal top groove 24 disposed under the control panel 18. The front panel 12 can then be bowed so that its side edges 26 can be removed from the vertical side grooves 22.

While the invention has been described in an arrangement for retaining the bottom edge of a panel 12, it should be understood to those skilled in the art that the retainer strip 32, 132, 232 could be used to retain a side or top edge as well.

It should be understood that various changes and modifications to the presently preferred embodiments herein will be apparent to those skilled in the art. Such changes and modifications may be made without departing from the spirit and scope of the present invention and without diminishing its attendant advantages. It is, therefore, intended that such changes and modifications be covered by the appended claims.

The embodiments of the invention in which an exclusive property or privilege is claimed are therefore defined as follows:

1. An appliance comprising:

a frame having grooves;

a removable panel having edges;

a channel member secured to said frame disposed adjacent to said panel; and an elongated retainer strip having at least one projection that extends substantially a length of said retainer strip;

wherein said at least one projection fits into said channel member so that said retainer strip can retain an edge of said panel and a remainder of said edges are retained in said grooves.

2. An appliance according to claim 1 which is a dishwasher.

3. An appliance according to claim 1 wherein said panel is on a door.

4. An appliance according to claim 1 wherein said retainer strip retains a bottom edge of said panel.

5. An appliance according to claim 1 wherein said retainer strip is slightly longer than said channel member.

6. An appliance according to claim 1 wherein said retainer strip is made of resilient material.

7. An appliance according to claim 1 wherein said channel member is made of resilient material.

8. An appliance according to claim 1 wherein said at least one projection is a T-shaped projection.

9. An appliance according to claim 1 wherein said at least one projection is a pair of projections.

10. An apparatus for retaining a panel comprising:

a retainer strip having an elongated resilient member, which has a T-shaped projection disposed substantially along a length of said resilient member and extending generally perpendicularly therefrom, said member having an upper half that is turned toward a direction in which said T-shaped projection extends; and a channel member having an upper resilient ledge and a lower resilient ledge between which is formed a channel interior, said upper ledge and said lower ledge being shaped to receive an hold said T-shaped projection in said channel interior in a snap-fit manner, said lower ledge being obliquely engageable against said T-shaped projection such that said T-shaped protection is slidably urged into said channel;

wherein an edge of said panel can be supported by said upper ledge and said T-shaped projection is insertable into said channel interior so that said upper half of said resilient member is in biased contact against said panel to hold said panel;

wherein said retainer strip is removable by pulling on said strip so that said upper ledge and said lower ledge are deflected for withdrawing said T-shaped projection from said channel interior.

11. An apparatus according to claim 10 further comprising a lower half of said resilient member shaped so that said retainer strip is symmetrical on either side of said projection.

12. An apparatus according to claim 10 further comprising a ridge that extends upwardly from said upper ledge.

13. An apparatus according to claim 10 wherein said apparatus is mounted on a dishwasher door.

14. An apparatus according to claim 10 wherein said upper half is angled in a direction in which said T-shaped projection extends.

15. An apparatus according to claim 10 wherein said retainer strip is longer than said channel member.

16. An apparatus for retaining a panel comprising:

a retainer strip having an elongated resilient member, which has an upper projection and a lower projection, each disposed substantially along a length of said resilient member and extending generally perpendicularly therefrom so that said upper projection and said lower projection are generally parallel, said resilient member having an elongated upper half that is turned toward a direction in which said projections extend; and a channel member having an upper ledge and a lower ledge such that a channel interior is formed between said upper ledge and said lower ledge which is shaped to receive and hold said two projections in a snap-fit manner such that said two projections are resiliently biased away from each other against the respective ledges when in the channel;

wherein an edge of said panel can be supported by said upper ledge, said projections being insertable into said channel so that said projections are held in said channel, said upper half of said resilient member being biased against said panel to hold said panel;

wherein said retainer strip is removable by pulling on said strip so that said projections are deflected for withdrawing said projections from said channel.

17. An apparatus according to claim 16, further comprising a lower half of said resilient member shaped so that said retainer strip is symmetrical on either side of said projections.

18. An apparatus according to claim 16 further comprising a ridge that extends upwardly from said upper ledge.

19. An apparatus according to claim 16 wherein said upper half is curved toward a direction in which said projections extend.

20. An apparatus according to claim 16 wherein said retainer strip is longer than said channel member.

* * * * *